(12) United States Patent
Fillon

(10) Patent No.: US 8,591,746 B2
(45) Date of Patent: Nov. 26, 2013

(54) SCREENING DEVICE FOR SUPPLYING WATER TO AN INDUSTRIAL INSTALLATION

(75) Inventor: Manuel Fillon, Paris (FR)

(73) Assignee: E. Beaudrey et Cie, Paris (FR)

( * ) Notice: Subject to any disclaimer, the term of this patent is extended or adjusted under 35 U.S.C. 154(b) by 233 days.

(21) Appl. No.: 13/113,424

(22) Filed: May 23, 2011

(65) Prior Publication Data

US 2011/0284474 A1   Nov. 24, 2011

(30) Foreign Application Priority Data

May 21, 2010   (FR) ...................................... 10 53988

(51) Int. Cl.
  *E03F 5/14*   (2006.01)
  *B01D 33/04*   (2006.01)
  *B01D 35/147*   (2006.01)
  *B01D 33/80*   (2006.01)

(52) U.S. Cl.
  CPC .............. *E03F 5/14* (2013.01); *B01D 35/147* (2013.01); *B01D 33/04* (2013.01); *B01D 33/808* (2013.01)
  USPC ........ 210/741; 210/747.5; 210/783; 210/790; 210/130; 210/160; 210/434

(58) Field of Classification Search
  USPC .............. 210/741, 747.5, 767, 783, 784, 790, 210/130, 137, 156, 160, 161, 162, 170.1, 210/433.1, 434
  See application file for complete search history.

(56) References Cited

U.S. PATENT DOCUMENTS

| | | | | |
|---|---|---|---|---|
| 1,653,473 A | * | 12/1927 | Schulz | 210/433.1 |
| 2,557,064 A | * | 6/1951 | Alexander | 210/434 |
| 3,372,807 A | * | 3/1968 | Barnard | 210/434 |
| 5,489,378 A | | 2/1996 | Cheesman et al. | |
| 6,106,706 A | * | 8/2000 | Roy et al. | 210/130 |
| 6,668,390 B1 | * | 12/2003 | Gonzalez | 210/162 |
| 8,083,937 B2 | * | 12/2011 | Happel | 210/162 |
| 2002/0113026 A1 | | 8/2002 | Seidl | |
| 2004/0134843 A1 | | 7/2004 | Kolb | |
| 2009/0314722 A1 | * | 12/2009 | Kelly et al. | 210/137 |

FOREIGN PATENT DOCUMENTS

DE   39 20 196 A1   1/1991
EP   1 366 245 B1   12/2003

OTHER PUBLICATIONS

French Search Report, dated Jan. 5, 2011, from corresponding French application.

* cited by examiner

*Primary Examiner* — Christopher Upton
(74) *Attorney, Agent, or Firm* — Young & Thompson

(57) ABSTRACT

A screening installation includes, provided in a flume (5) conveying a fluid flowing with a total flow $Q_E$:
  a screening device (10) including a screen which includes at least one filter member in order to screen a fraction $Q_{10}$ of the total flow,
  at least one first passage (31) in the flume which is adapted to allow a fraction $Q_{31}$ of the total flow to pass such that $Q_E = Q_{10} + Q_{31}$, so long as the head loss between the upstream side and the downstream side of the screening device is less than a predetermined value, and
  at least one second passage (32) in the flume which is adapted to allow a fraction $Q_{32}$ of the total flow to pass such that $Q_E = Q_{10} + Q_{31} + Q_{32}$ when the head loss is greater than the predetermined value.

11 Claims, 4 Drawing Sheets

SCREENING DEVICE FOR SUPPLYING WATER TO AN INDUSTRIAL INSTALLATION

BACKGROUND OF THE INVENTION

The present invention generally relates to a screening device implemented for the water supply of an industrial installation of some kind, in particular for the supply of cooling water for such an installation. More particularly it concerns a screening installation for reducing the detritus content of a water course downstream of said screening device in the proportion of the screened flow relative to the total flow of the water course concerned.

The invention finds a general application in the fields in which it is desired to remove at least part of the debris of various origins (vegetable, animal or human) that encumber and congest water courses, in order for the water downstream to be cleaner.

This is the case of certain water courses for reasons of appearance (rivers, urban canals, etc.).

It is also the case when the concentration of debris is too high for the use of the water downstream (intake of water for power stations, under-sized screening stations, etc.).

In practice, the filter member of the screening device is movable in an endless loop, which may be circular or elongate. The screening device is then a rotary drum or a band screen.

Solutions to the problem of reducing the detritus content of a water course downstream of a screening device are already known.

A first known solution consists of constructing a conventional water takeoff in a work of civil engineering with a gravity-feed inlet, treatment of the water by a conventional system comprising trash raking and screening, then pumping in order to return the water to the water course downstream.

Such a solution is however not satisfactory due to the cost of implementation of the work of civil engineering, which is in particular established beneath the water level.

A second solution consists in installing a filter in a casing with the screened stream created by mechanical extractors with a very small added manometric head. For the pumping, this solution however requires a provision of energy which is not always easily available.

BRIEF SUMMARY OF THE INVENTION

The present invention mitigates at least one of these drawbacks.

The present invention thus relates to a screening installation comprising, provided in a flume (5) conveying a fluid flowing with a total flow $Q_E$:

- a screening device (10) comprising a screen which comprises at least one filter member in order to screen a fraction $Q_{10}$ of the total flow,
- at least one first permanently open passage in the flume having a passage cross-section adapted to allow a fraction $Q_{31}$ of the total flow to pass such that $Q_E = Q_{10} + Q_{31}$, the total flow thus being divided between the screening device and said at least one first passage so long as the head loss between the upstream side and the downstream side of the screening device is less than a predetermined value,
- at least one second passage (32) in the flume which is operative when the head loss between the upstream side and the downstream side of the screening device is greater than a predetermined value and which has a passage cross-section adapted to allow a fraction $Q_{32}$ of the total flow to pass such that $Q_E = Q_{10} + Q_{31} + Q_{32}$ when said head loss is greater than the predetermined value.

The screening device enables the transported debris concentration of the fluid (for example water) to be reduced.

However, the more it clogs as it stops the voluminous items of debris, the less it is capable of allowing the fluid flow $Q_E$ to pass.

In this connection, at least one first passage having a first opening for the passage of a fraction of the flow is provided to enable the installation to operate while the screening device becomes congested with debris.

As from a certain value of the head loss between the upstream side and the downstream side of the screening device (this value reflects pronounced fouling of the device) at least one second fluid passage becomes operative to assist said at least one first passage to convey the total flow $Q_E$ at least in part.

As a matter of fact, without said at least one second passage the head loss between the upstream side and the downstream side would have a value such that the pumps situated downstream would risk becoming unprimed.

Thus it will be noted that the passage openings or cross-sections of said at least one first and second passages are dimensioned such that when the screening device is blocked by the various debris and filth the entire flow $Q_E$ can pass through said at least one first and second passages.

Such an installation, which requires no high energy input apart from the small flow of washing water under pressure and the few kilowatts necessary for the drive motor of the screen (when the latter is mobile), enables either to screen a part of the flow, or to enable the passage of the total flow without screening it according to the needs for cleaning the fluid. The installation furthermore requires no complementary work of civil engineering.

It should be noted that said at least one first passage is open permanently open in order for the installation to be capable of operating even when the flow of the fluid passing through the screening device reduces further to the clogging thereof.

According to a feature, said at least one second passage is equipped with a unit which is movable between an obturating position of said at least one passage and an open position in which the fraction $Q_{32}$ of the total flow is capable of passing through said at least one passage.

Below a predetermined head loss value said at least one second passage remains closed, the flow $Q_E$ being dealt with solely by the screening device and by said at least one first passage.

As soon as the screening device becomes too blocked, the head loss created by the entirety of the installation becomes too high and exceeds the predetermined value referred to above.

This induces the opening of said at least one second passage in order to allow a fraction of the total flow of the flume to pass via that bypass.

The passage from the obturating position to the open position is manually or automatically actuated.

According to a feature, the movement from the obturating position to the open position depends on the head loss value.

As a matter of fact, it is the value of the head loss created by the installation in operation which governs the movement of the unit and thus the opening of said at least one second passage.

According to a feature, the movable unit is a valve which is for example weighted in order to keep it stably in closed position.

According to a feature, the installation comprises a wall separating the flume between an upstream zone and a downstream zone, the screening device being fastened to the wall and said at least one first and second passages being provided in said wall.

This wall extends for example transversely in the flume such that the flow $Q_E$ of the fluid necessarily passes through one or more of the parts constituting the installation (screening device, first and second passages).

According to an embodiment, the separating wall is a wall included in the civil engineering work.

According to another embodiment, the wall is of metal and is fastened to the walls of the flume.

According to a feature, the screening device and said at least one first and second passages are arranged transversely in the flume such that said at least one first passage is disposed between the screening device and said at least one second passage.

In practice, the screening device and said at least one first and second passages are provided in a wall which extends transversely relative to the flume and to the longitudinal walls that delimit it.

By way of example, the screening means of the screening device comprise at least one protective grating equipped with bars spaced apart by a few centimeters. Thus, the water to screen enters by the face of the basin equipped with the grating and the constituents that are too voluminous are stopped on the outer surface of the grid, from where they may possibly be removed by a mechanical rake termed trash rake.

For example, the basin is formed from metal or composite material, or as a work of civil engineering (for example from concrete).

According to a feature, the screen is continuously moved in order to be able to remove the debris from the fluid in a substantially continuous manner.

In practice the screen is a drum screen or band screen equipped with mesh for example having a mesh size of a few millimeters.

According to an embodiment, the screen has internal take-off as for a rotary drum or a dual flow band screen, the current of fluid (e.g. water) being chosen such that the downstream section of the filter member is passed through by the water from the inside of the screen to the outside thereof.

According to another embodiment, the screen is a through-flow filter.

In practice, the openings enabling the passage of the water without prior screening are situated either beside the rotary screen, or below it according to criteria of convenience.

The invention also relates to a method for screening a fluid flowing in a flume (5) with a total flow of $Q_E$, comprising:

the screening of a fraction $Q_{10}$ of the total flow through a screening device (10) provided in the flume, the passage of a fraction $Q_{31}$ of the total flow through at least one first passage (31) provided in the flume, the total flow being divided between the screening device and said at least one first passage depending on the degree of clogging of the screening device so long as the head loss between the upstream side and the downstream side of the screening device is less than a predetermined value, when the head loss between the upstream side and the downstream side of the screening device becomes greater than the predetermined value, that is to say that the degree of clogging of the screening device increases beyond a predetermined degree of clogging, the method further comprises passing a fraction $Q_{32}$ of the total flow through at least one second passage (32) provided in the flume, the total flow being divided between the screen-ing device ($Q_{10}$), said at least one first passage ($Q_{31}$) and said at least one second passage ($Q_{32}$).

According to a possible feature, the method comprises opening said at least one second passage (32) when the head loss between the upstream side and the downstream side of the screening device becomes greater than the predetermined value, said at least one second passage being obturated when the head loss is less than the predetermined value.

BRIEF DESCRIPTION OF THE SEVERAL VIEWS OF THE DRAWING

Other features and advantages of the invention will appear in the light of the following detailed description and accompanying drawings in which.

DETAILED DESCRIPTION OF THE INVENTION

Figure 1:
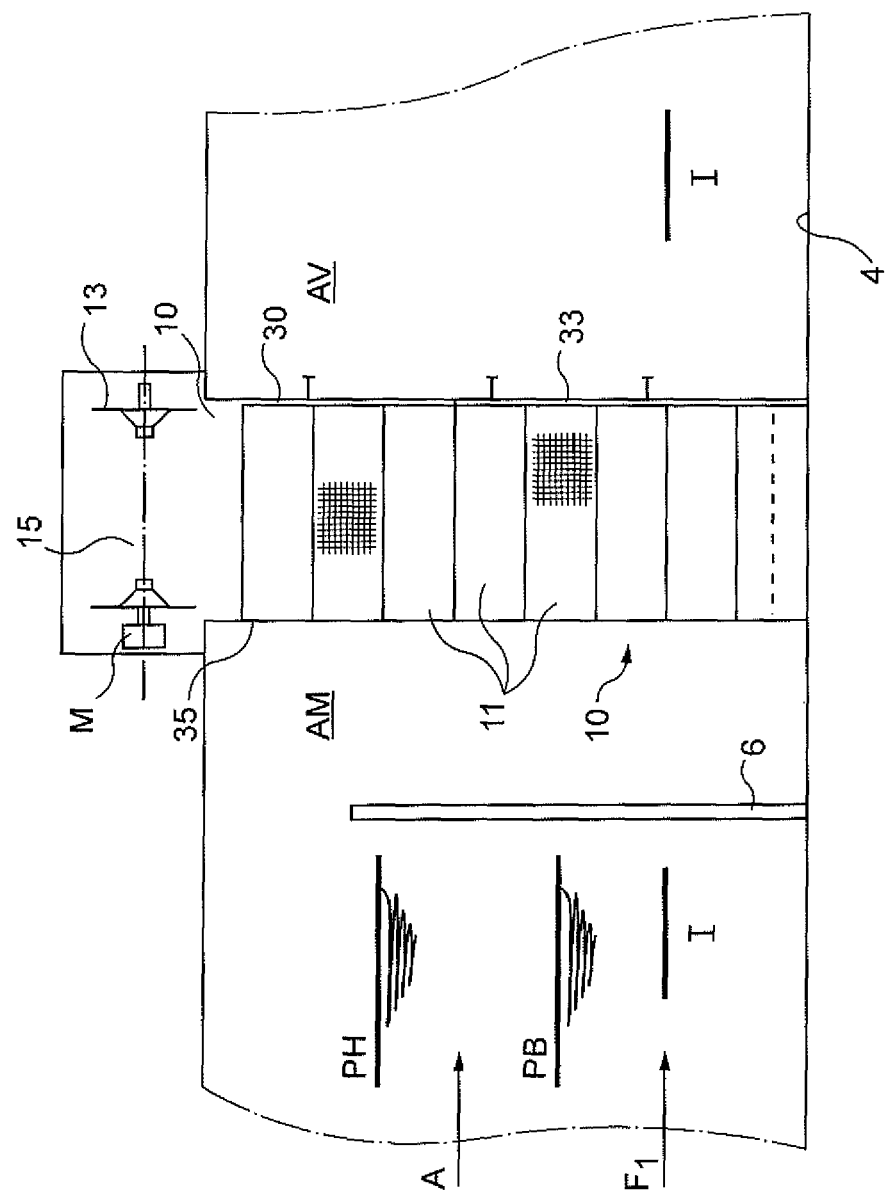
FIG. 1 is a longitudinal vertical cross-section view of an installation according to one embodiment of the invention.
Figure 2:
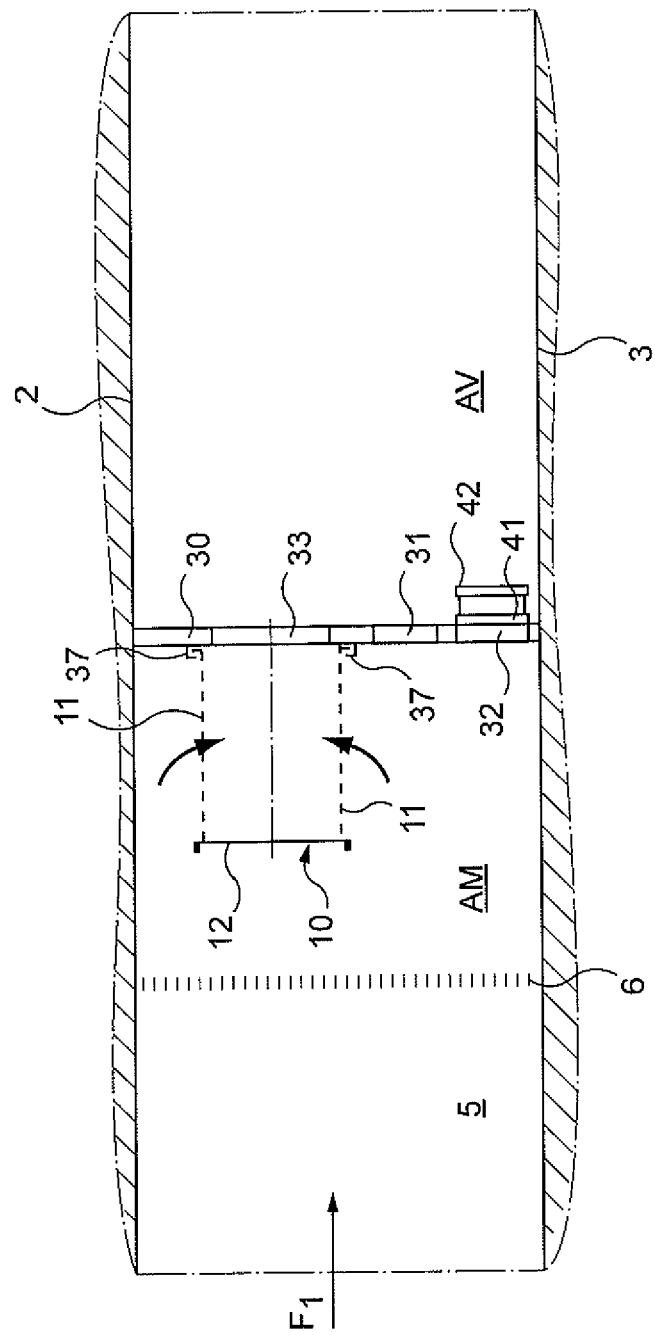
FIG. 2 is a view of the installation of FIG. 1 in longitudinal horizontal cross-section under the water level, on the section plane I-I of FIG. 1.
Figure 3:
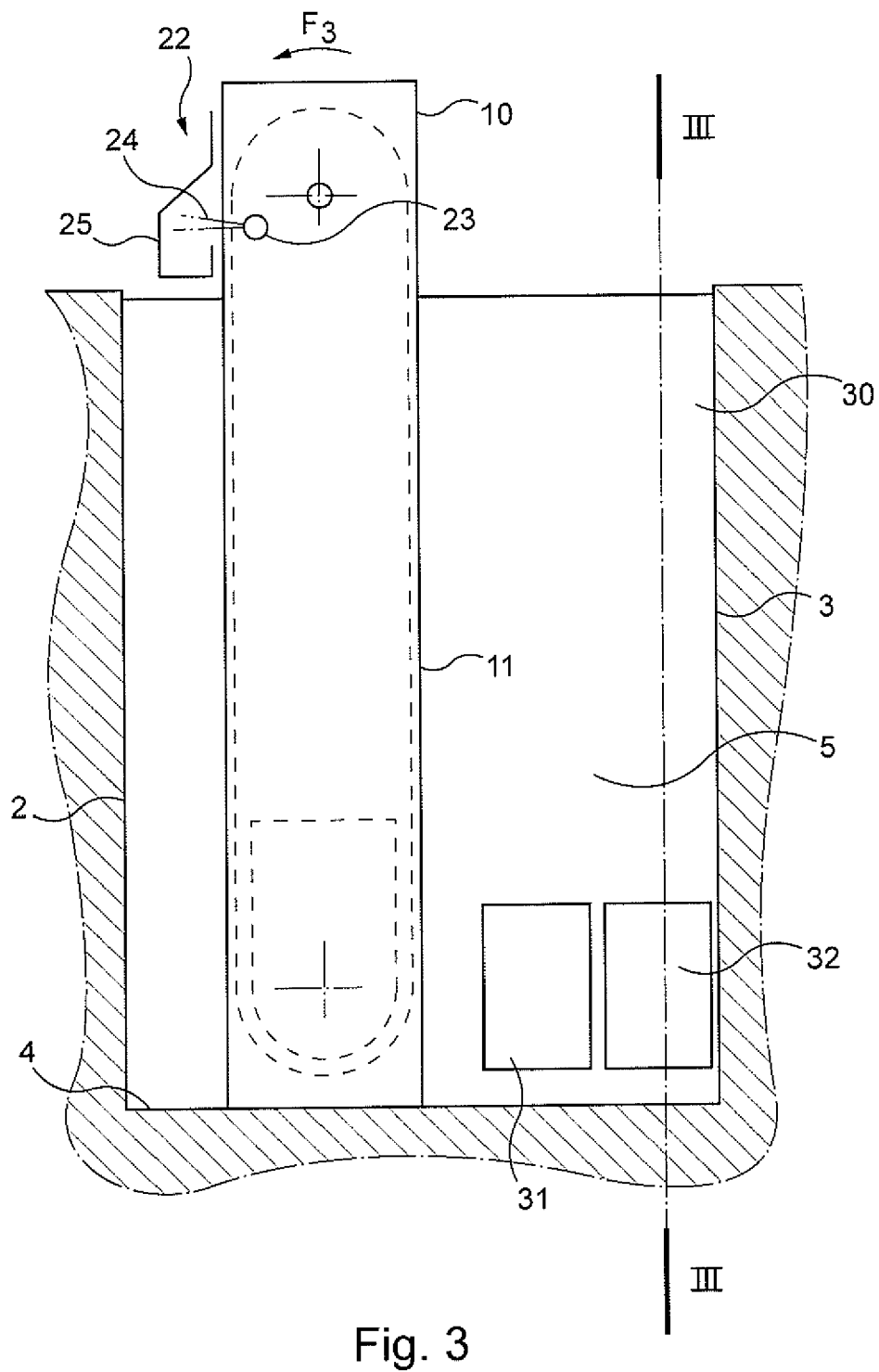
FIG. 3 is a view along Arrow A of FIG. 1 of the flume from upstream thereof.

As represented in FIGS. 1 to 3, a screening installation according to the invention is provided in an elongate flume or channel 1 conveying a fluid such as water with a total flow $Q_E$.

The flume is delimited by two longitudinal walls 2 and 3 (FIG. 2) and by a bottom wall 4 (FIG. 1).

The installation comprises a separating wall 30 extending transversely relative to the walls 2 and 3 and which separates an upstream AM zone of the flume from a downstream AV zone. On the upstream AM zone side, the water to screen, referenced by the arrow F1 in FIGS. 1, 2 and 4, flows with a total flow of $Q_E$. The wall is provided with several passages in which openings are formed for the passage of unscreened water.

The installation comprises a screening device for reducing the content of diverse detritus and debris transported by the water. The device is arranged in the flume and is more particularly mounted on the wall 30 (FIGS. 1 and 2) while projecting relative to the wall in the upstream zone.

To that end, the screening device comprises a filter screen 10.

Generally, the filter screen employed comprises a filter member, such as a textile member, a perforated sheet of metal, or another movable member, in an endless loop. For example, that loop may be circular, the filter screen then forming a drum rotatably mounted about a shaft.

With reference to FIGS. 1 and 2, an endless loop of elongate form has been represented, in which the filter screen 10 is of the type referred to as dual flow band screen, that is to say in which the unfiltered water remains outside the filter and in which the filtered water is within the filter.

The invention also applies to other forms of fluid flow (inside/outside, through-flow).

Alternatively, the screen may be of the trash rake type in which the grating comprises very closely spaced bars (bars close together)

The filter 10 comprises filter members referred to as filter panels 11 which are disposed across the stream and are carried by two chains, one on each side, constituting an endless loop, elongated in the vertical direction, the upper and lower shafts being longitudinal.

The formation of the dual flow band screen 10 is well known per se and will only be described here succinctly.

The panels 11 which are consecutively arranged form a loop supported by coaxial sprockets 13 disposed in the upper part and with which the panel-carrying chains mesh.

A shaft 15 bearing the upper sprockets 13 turns on two bearings, each disposed on a respective side, and is rotationally driven in the direction of arrow $F_3$ (FIG. 3) by a drive system M known per se. The bearings are carried by a frame 35 which is generally slid into vertical wall guides 37 fastened to the separating wall 30.

In practice and as is represented with reference to FIG. 1, the filter 10 is only partially immersed in the water to filter.

In FIG. 1, the level of that water has been indicated by PB for the lowest water and by PH for the level of that water for the highest water.

As is usual, it is provided to associate a washing station 22 (FIG. 3) with the unsubmerged part of the filter 10. This washing station 22 is disposed above the level PH for the highest water, adjacent the unsubmerged part of the band screen 10 that is the most downstream side in terms of the direction of movement of that filter member, that is to say in the direction of its rotation, as referenced by way of example by the arrow $F_3$ of FIG. 3.

In a manner known per se, the washing station 22 comprises, within the filter 10 (FIG. 3):
one or more washing spray bars 23 each configured to project a sheet of water 24 substantially perpendicularly through the filter member 11 facing that filter,
and, outside the latter, in register with the spray bar or bars 23 (opposite that spray bar or bars) a gutter 25 configured to collect the debris detached from the filter member by the sheet of water 24.

Upstream of the channel, a grating 6 of bars spaced apart by a few centimeters protects the entirety of the equipment downstream from the largest constituents conveyed by the stream.

As represented in FIGS. 1 and 2, an opening 33 is made in the wall 30 facing the screening device 10.

This arrangement enables the water, which has been screened after having crossed the filter panels 11, to leave the device via the opening 33 and to join the downstream AV zone.

As already briefly mentioned above, a first water passage 31 comprises an opening of for example rectangular cross-section in FIG. 3 and which is for example disposed in the lower part of the wall 30.

This opening lacks any closure unit with the aim of enabling continuous passage of a fraction $Q_{31}$ of the total water flow. The fraction of water passing through increases progressively as the flow passing through the screening device 10 reduces further to clogging.

A second water passage 32 also comprises an opening of for example rectangular cross-section and which is for example disposed in the lower part of the wall 30, beside the opening 31 (FIG. 3).

The passage 31 is disposed between the device 10 and the passage 32 but the opposite arrangement may be envisaged, as can be other arrangements in which the passages 31 and 32 are disposed in the upper part of the wall and, for example one above the other.

Figure 4:
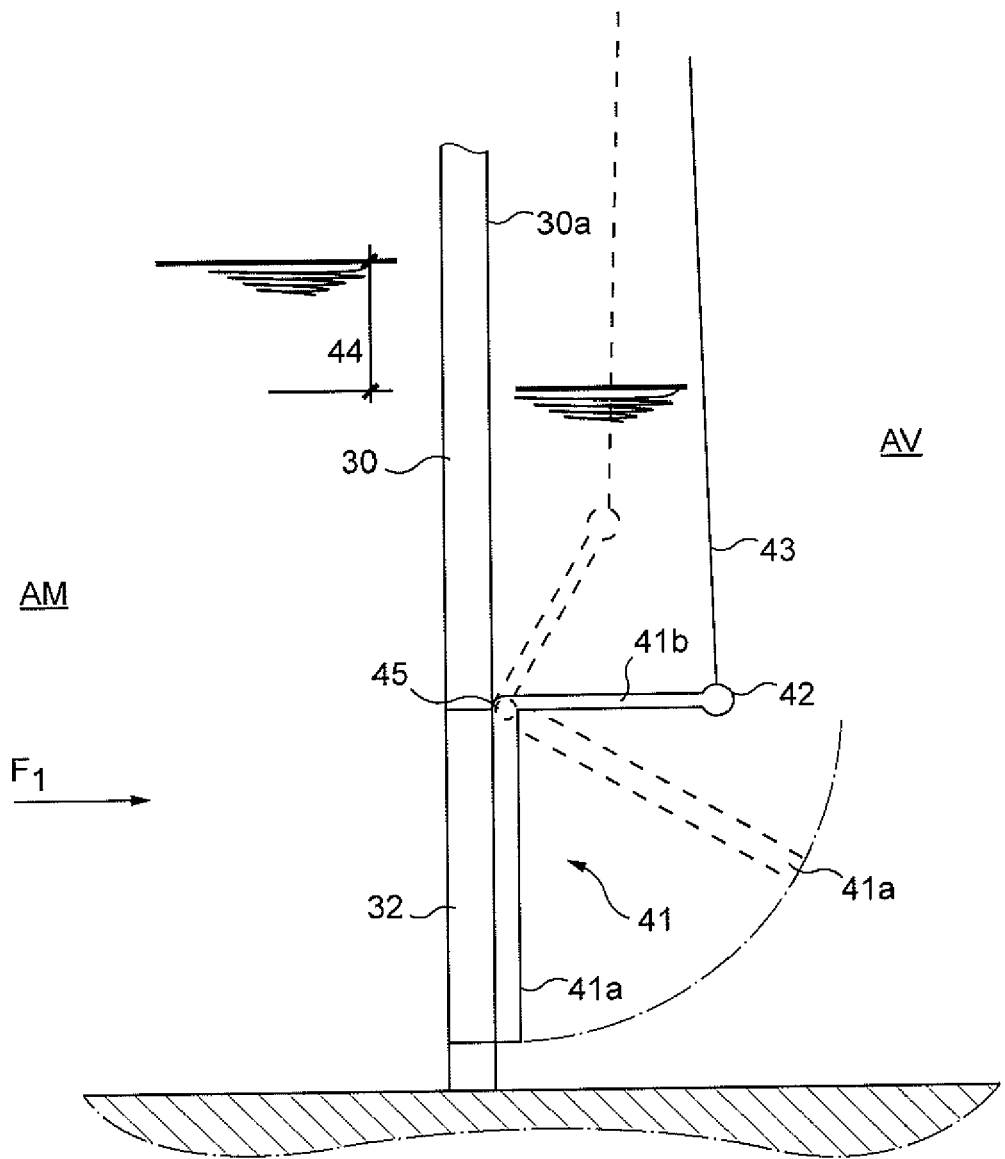
FIG. 4 is an enlarged partial view of the cross-section on the section plane III-III of FIG. 3.

The opening 32 is provided with a movable unit 41 which can be displaced between two positions illustrated in FIG. 4: an obturating position (in full line) preventing the passage of water from the upstream zone to the downstream zone and a raised open position (in dashed line) enabling the passage of water.

The movable unit is held in closed position so long as certain conditions of head loss are not met as will be seen below.

The movable unit 41 is for example a valve which comprises two parts, a first part 41a having the form of a plate of which the shape or the area disposed facing the opening 32 in obturating position has dimensions at least equal to those of the opening 32 in order to block it.

In a simple manner, part 41a is of substantially rectangular transverse section.

The valve also comprises a second part 41b disposed for example at a right angle to the first part 41a and which forms an actuating arm.

The valve is pivotally mounted on a face 30a of the wall 30 that is situated on the downstream AV side, and more particularly is hinged relative to a pivotal axis 45.

The valve is for example weighted in order to avoid the passage of any flow until the head loss between the upstream side and the downstream side attains a chosen value (a few tens of cm in practice).

The valve 41 equipping the opening 32 is provided with a counterweight 42 which is designed to begin to open by pivoting around the axis 45 only for a head loss 44 greater than or equal to a predetermined value $H_1$.

a) When the screen 10 is in use, its head loss 44 varies with its soiling but its operation which is affected by the head loss, according to means known per se, avoids that loss exceeding the predetermined value $H_1$ (FIG. 4).

At the start of the operation of the installation (there is little or no clogging of the screen and the flow passing through it is therefore little affected) the entering water flow $Q_E$ (total flow conveyed by the flume upstream of the wall 30) is divided between the screen 10 ($Q_{10}$) and the aperture 31 ($Q_{31}$). The sum of the flows $Q_{10}$ and $Q_{31}$ is equal to $Q_E$. The less the screen 10 is clogged, the higher the flow $Q_{10}$. It should be noted that the screened water comes out from the downstream side of the device 10 by the opening 33 and mixes with the unscreened water that passed through opening 31. The flow $Q_S$ leaving by the opening 33 contains substantially less clogging constituents, since all those conveyed by the flow $Q_{10}$ have been retained by the screen 10.

b) if for any reason, the clogging of the screen 10 is such that the flow $Q_{10}$ reduces until the flow $Q_{31}$ creates a head loss 44 greater than $H_1$ to pass through the opening 31, the valve 41 opens by pivoting upwards until its admits a fraction of the flow denoted $Q_{32}$ which reduces by the same amount the flow to treat by the filter screen 10.

The degree of opening of the valve 41 depends on the degree of clogging of the filter screen.

The opening 31, the valve 41 (and thus the opening 32) and its counterweight are dimensioned such that, if the flow $Q_{10}$ is cut (screen 10 entirely blocked) the total flow $Q_E=Q_{31}+Q_{32}$ passes through the wall 30 while creating a limited head loss slightly greater than $H_1$. Thus, in case of failure affecting the screen 10, the flow $Q_E$ will still be available downstream subject to a slight additional head loss.

c) If, for any reason, the operator wishes to temporarily stop the operation of the screen (for maintenance, for example) while ensuring the flow can pass with a minimum of head loss, he opens the valve by pulling on a flexible lead 43 (cable, chain, cord, etc.) linked to the valve via the arm 41b, until the valve 41 is fully raised and thus open. The openings 31 and 32 then admit the flow for a head loss very much less than $H_1$.

It should be noted that the value $H_1$ is chosen to be equal to the head loss on the screen 10 that gives a maximum debris treatment capacity (0.30 m, for example). This enables the screen 10 to be used as well as possible and to ensure that the flow $Q_S$ contains the least possible clogging constituents, given the potential of the screen (width, speed of translation, etc.).

According to a variant, the openings 31 and 32 may each be split into several apertures.

These openings may be situated adjacent the screen as indicated in the preceding description, or below the screen 10, or else on the wall 12 upstream of the screen. Any combination of these positions also forms part of the present invention.

The invention claimed is:

1. A screening installation comprising, provided in a flume (5) conveying a fluid flowing with a total flow QE:
   a screening device (10) comprising a screen which comprises at least one filter member in order to screen a fraction $Q_{10}$ of the total flow,
   at least one first permanently open passage in the flume having a passage cross-section adapted to allow a fraction $Q_{31}$ of the total flow to pass such that $Q_E=Q_{10}+Q_{31}$, the total flow thus being divided between the screening device and said at least one first passage so long as the head loss between the upstream side and the downstream side of the screening device is less than a predetermined value,
   at least one second passage (32) in the flume which is operative when the head loss between the upstream side and the downstream side of the screening device is greater than a predetermined value and which has a passage cross-section adapted to allow a fraction $Q_{32}$ of the total flow to pass such that $Q_E=Q_{10}+Q_{31}+Q_{32}$ when said head loss is greater than the predetermined value.

2. An installation according to claim 1, characterized in that said at least one second passage (32) is equipped with a unit (41) which is movable between an obturating position of said at least one passage and an open position in which the fraction $Q_{32}$ of the total flow is capable of passing through said at least one passage.

3. An installation according to claim 2, characterized in that the movement from the obturating position to the open position depends on the head loss value.

4. An installation according to claim 3, characterized in that the movable unit is a valve.

5. An installation according to claim 2, characterized in that the movable unit is a valve.

6. An installation according to claim 1, characterized in that it comprises a wall (30) separating the flume between an upstream zone and a downstream zone, the screening device being fastened to the wall and said at least one first and second passages being provided in said wall.

7. An installation according to claim 1, characterized in that the screening device (10) and said at least one first and second passages (31, 32) are arranged transversely in the flume such that said at least one first passage is disposed between the screening device and said at least one second passage.

8. An installation according to claim 1, characterized in that the screen (10) is continuously moved.

9. An installation according to claim 1, characterized in that the screen is a band screen.

10. A method for screening a fluid flowing in a flume (5) with a total flow of $Q_E$, comprising:
    the screening of a fraction $Q_{10}$ of the total flow through a screening device (10) provided in the flume,
    the passage of a fraction $Q_{31}$ of the total flow through at least one first passage (31) provided in the flume, the total flow being divided between the screening device and said at least one first passage depending on the degree of clogging of the screening device so long as the head loss between the upstream side and the downstream side of the screening device is less than a predetermined value,
    when the head loss between the upstream side and the downstream side of the screening device becomes greater than the predetermined value, that is to say that the degree of clogging of the screening device increases beyond a predetermined degree of clogging, the method further comprises passing a fraction $Q_{32}$ of the total flow through at least one second passage (32) provided in the flume, the total flow being divided between the screening device ($Q_{10}$), said at least one first passage ($Q_{31}$) and said at least one second passage ($Q_{32}$).

11. A method according to claim 10, characterized in that it comprises opening said at least one second passage (32) when the head loss between the upstream side and the downstream side of the screening device becomes greater than the predetermined value, said at least one second passage being obturated when the head loss is less than the predetermined value.

* * * * *